Sept. 20, 1960 R. R. ALLEN 2,953,353
APPARATUS FOR DRILLING HOLES IN EARTH
Filed June 13, 1957 2 Sheets-Sheet 1
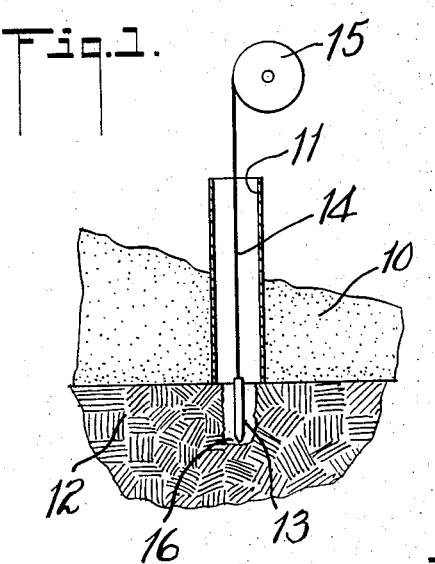
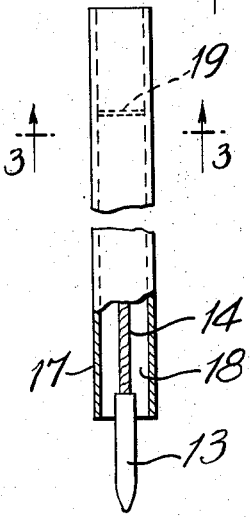
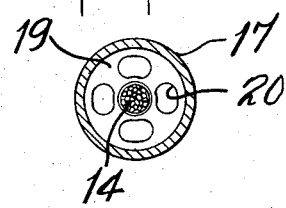
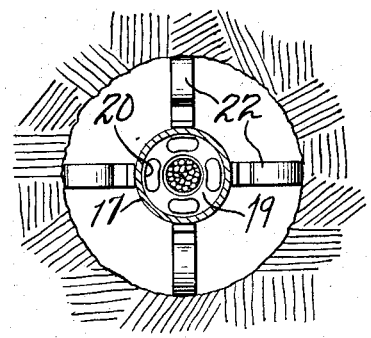
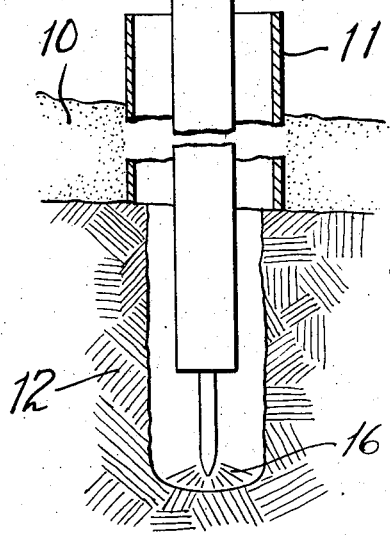
INVENTOR.
ROBERT R. ALLEN
BY
ATTORNEY

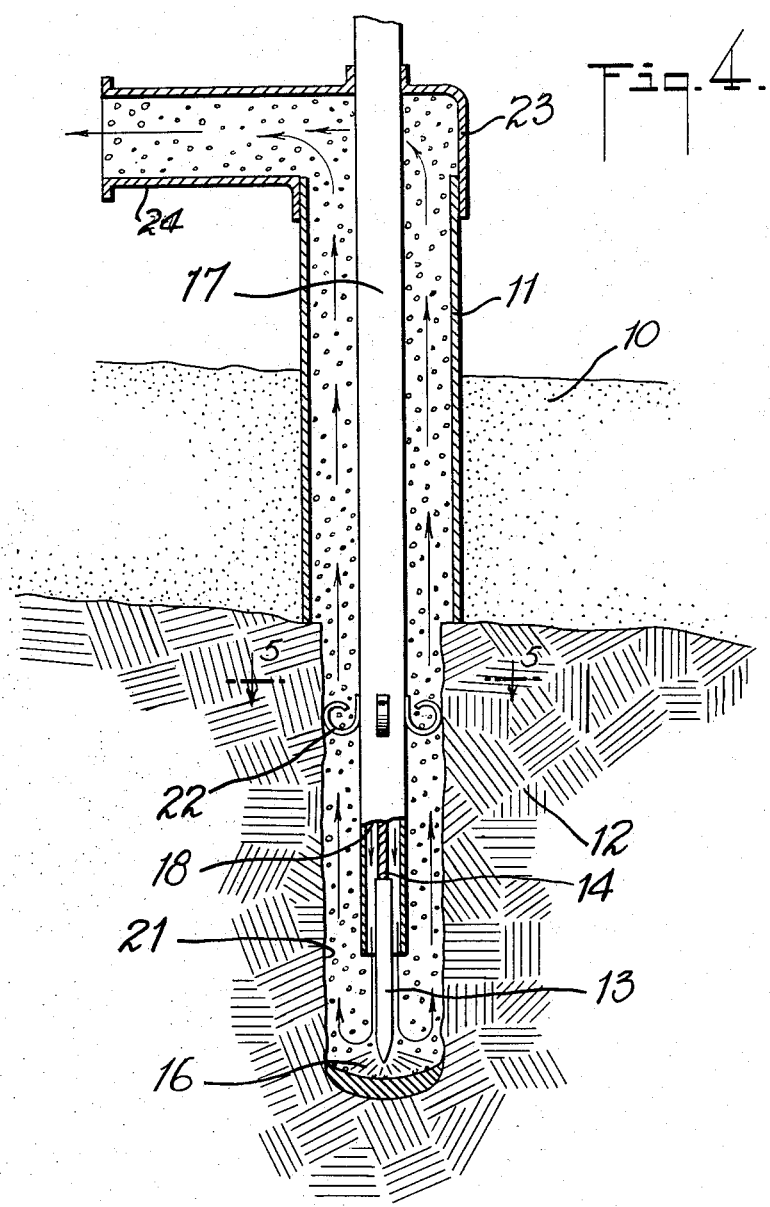

United States Patent Office 2,953,353
Patented Sept. 20, 1960

2,953,353
APPARATUS FOR DRILLING HOLES IN EARTH

Robert R. Allen, West Orange, N.J., assignor, by mesne assignments, to Benjamin G. Bowden, Springfield, and Robert R. Allen, Madison, N.J.

Filed June 13, 1957, Ser. No. 665,442

3 Claims. (Cl. 255—36)

My present invention relates to a method and apparatus for producing holes in earth formations, including rock and ore formations. It is particularly suited for field prospecting for, and testing of, deposits or minerals covered by an overburden of earth or rock. Such minerals may comprise uranium or other radio active materials. Generally deposits or veins of such minerals lie at a sufficiently shallow depth that indications of their richness and extent may be obtained by holes drilled to correspondingly shallow depths.

Heretofore, apparatus for drilling such holes has consisted of core drills, diamond drills and similar apparatus which are cumbersome and expensive to build, maintain and operate in the field. Moreover, drills of this type also require a supply of water or compressed air, which are not, in many cases, available in the field in which the holes are to be made.

My invention obviates the disadvantages of the above apparatus and provides a means which may be operated without a supply of water or pneumatic apparatus and which is inexpensive to build, maintain and operate as well as being readily transportable from one location to another.

In the method of my invention, I strike an arc between an electrode and the earth, rock or other formation to melt or otherwise disintegrate a small spot therein and blow away the molten or disintegrated particles. A hole is thus started and progressively penetrated into the rock.

Where the earth is loose near the surface, this loose earth may be removed by other methods and the method of my invention may be applied to the underlying rock or other solid formation.

The apparatus of my invention comprises an electrode through which an arc may be struck and maintained with the formation to be penetrated or drilled so as to melt and disintegrate the earth formation at the arc. The apparatus also comprises means to conduct a stream of air or other gaseous fluid to the vicinity of the arc to take up the disintegrated material and carry it away. Electric energy is supplied to the arc from a suitable source through a conductor which progressively lowers the electrode as the arc penetrates the formation so as to maintain the arc. The gas or air delivery means is also lowered progressively. In this manner a hole is quickly formed in the earth formation. The source of electric energy and of air or gas supply may be any suitable generator or commercial power line, if available, and a blower powered by the generator or source of electric energy or compressed gas container that may be readily transported. Samples may be taken continuously or intermittently from the disintegrated material carried away from the arc or the drilling may be interrupted periodically to examine the formation and to take samples at successive depths.

The various features of my invention are illustrated by way of example in the accompanying drawings, in which:

Fig. 1 is a vertical section of a hole in an earth formation showing diagrammatically an electrode, an air supply conduit, and connecting means embodying my invention.

Fig. 2 is a side view, partly in section, on a larger scale, of the electrode and an air or gas delivery tube.

Fig. 3 is a horizontal section on line 3—3 of Fig. 2.

Fig. 4 is a vertical section showing the apparatus in process of forming a hole in an earth formation.

Fig. 5 is a horizontal section on line 5—5 of Fig. 4 of an air delivery tube and electric conductor and guide means for centering the tube and conductor in a hole.

Fig. 6 is a side view of the apparatus showing means for lowering the electrode and air supply tube during the hole forming operation.

In the embodiment illustrated in Fig. 1, a hole is formed in loose or soft material 10 near the surface and lined by a casing 11 to the surface of underlying rock or hard material 12 to prevent loose material from the surface material 10 from falling into the hole being formed in the harder sub-strate. An electrode 13 is suspended by a conductor cable 14 depending through the casing 11 from a supporting drum 15 by which the conductor and electrode may be lowered as the hole through the sub-strate deepens.

When current is supplied from any suitable source to the conductor 14 and electrode 13, an arc 16 is struck between the lower end of the electrode and the rock or other sub-strate 12, the rock is melted or disintegrated by the intense heat of the arc and is swept up through the casing and removed. To direct the air or gas current to the arc in such a manner as to entrain and carry away the molten or disintegrated matter, the conductor cable and electrode are enclosed in a conduit 17, Fig. 1, spaced from the cable and electrode to form an annular passage 18 for the gas or air in close proximity to the arc 16. The air or gas passes downwardly through the passage 18 to the arc, picks up the molten or disintegrated material and passes upwardly about the conduit. The electrode and cable are centered in the conduit by spacers 19 between the cable and conduit as shown in Fig. 3 and having openings 20 for the passage of the air or gas. The separation or spacing between the cable-like conductor and the spacers, see Figure 5 particularly, is necessary in order to provide for relative adjustment between the conductor and the conduit 17, see Figures 1 and 6.

As the arc 16 disintegrates the substrate 12 and the air or gas carries away the resulting particles, a hole 21 is formed in the substrate. This hole, being formed in a hard medium, need not be cased. To keep the electrode, cable and tube centered in the hole, fingers 22, Figs. 4 and 5, are provided at spaced intervals on the conduit 17 to contact the surface of the hole 21. These fingers are curved to contact the surface of the hole resiliently so as to accommodate themselves for small irregularities in the hole.

In the embodiment shown in Fig. 4, the upper part of the casing 11 is closed by a head 23 through which the conduit 17 passes air-tightly. The air or gas, carrying the entrained matter passes out of the head through an outlet branch 24 to any suitable receptacle. Samples may be separated and taken from the outflowing air or gas.

Any suitable means may be used to feed the conduit and electrode cable into the hole. By way of example, a pair of gripping wheels 25 and 26 having serrated, knurled, or other peripheral surfaces may be arranged at opposite sides of the conduit 17 and rotated at a speed to maintain the lower end of the conduit spaced from the bottom of the hole a distance to maintain the arc. The wheels 25 and 26 may be rotated simultaneously by any suitable means, manually, by a constant speed drive or an electrically controlled rate.

Current may be supplied through the cable 14 to the electrode 13 at any selected voltage or amperage suitable to the conditions of the sub-strate, the size of the hole and other conditions in the field. It will be understood that the arc is struck between the electrode 13 and the ground 12 and that the source of power is suitably grounded to the strata 12 so as to provide a complete circuit. The voltage drop through the arc itself is generally self controlled for an arc of a given size and length. In starting the arc a high voltage may be supplied either by means of the discharge of a condenser, transformer or other means known in the art. After the arc is struck a relatively low operating voltage may be used to maintain it owing to the ionization of the air or gas in the arc. A carbon rod or one of tungsten may be used as the electrode 13. The conductor 14 may be a stranded cable or a solid or hollow rod or successive rods secured end to end.

The diameter of the hole is a function of the speed of advance of the electrode, the rapidity of removal of the material and the power applied. Generally the highest possible feed rate and maximum power possible should be used so as to allow the minimum amount of heat to be conducted to the surrounding rock mass. To avoid the necessity for high voltages the distance for the spark to jump in starting the arc will generally be less than one centimeter. The arc gap may be as small as two or three millimeters. The starting and running voltage may, if necessary, be still further reduced by introducing conducting gasses or vapors into the spark gap by means of longitudinal passages in the enclosing tube. Increased voltage for starting the arc may be obtained by the discharge of a capacitor charged by the usual electronic rectifier circuit.

After establishment of the arc, it may be maintained by the output of a regular D.C. or A.C. generator, a transformer, or a low voltage radio frequency generator depending on frequency requirements. Establishing and maintaining the arc will also depend to some extent on the type of material being penetrated. In certain classes of material of high dielectric constant, high frequency current may be most effective. Lower radio frequencies are practical if the proper electrode, conductor and enclosing tube are used.

The feed of the electrode into the rock or ore pocket can easily be controlled by a relatively simple feed back control circuit which is sensitive to current input.

The diameter of the hole may be selected for the particular purpose for which it is required. In prospecting for radioactive materials, such as uranium, where a sensitive probe is to be employed, it may, for example, be a fraction of an inch in diameter.

Instead of using air or gas under pressure for bringing the disintegrated material to the surface, it may under some conditions be more convenient or preferable to introduce a liquid into the tube surrounding the electrode or otherwise introducing a liquid to the arc in such manner that the vaporization of the liquid would supply the gaseous medium for carrying the disintegrated material. The liquid might be dropped or forced into the tube in small amounts or in a small continuous stream which upon vaporization would create a gaseous medium under pressure to force the disintegrated or molten material upwardly about the tube to the surface.

Having described my invention, what I claim is:

1. An apparatus for producing holes in earth formations for prospecting comprising a casing adapted to be placed into loose surface material and to bear on rock-like formations beneath said material, a hollow tubular conduit member and an electrical conductor, said conduit member extending lengthwise within said casing and being adjustable with respect thereto, spacer means positioned at intervals in said conduit member and bearing against the latter, said conductor extending through said spacer means and being positioned with respect to said conduit member by the latter means, said conductor being movable lengthwise with respect to said conduit, an electrode device connected to the lower end of said conductor and extending downwardly from said conduit, said spacer means having openings extending vertically therethrough to provide a continuous fluid conduit surrounding said conductor, and means connected to said conduit and said conductor adapted to raise or lower said conduit and said conductor and electrode with respect to said casing.

2. The apparatus of claim 1, including finger-like means provided at spaced intervals on said conduit and projecting radially outwardly therefrom, said finger-like means being adapted to resiliently cooperate with rock strata to position said conduit and electrode within an opening bored in said strata.

3. The apparatus of claim 2 wherein said casing is a closed casing and said conduit passes in fluid-tight relationship adjustably therethrough, and said casing is provided with an outlet for directing entrained matter and fluid within said casing to a receptacle.

References Cited in the file of this patent

UNITED STATES PATENTS

| 1,898,926 | Aarts | Feb. 21, 1933 |
| 1,993,641 | Aarts et al. | Mar. 5, 1935 |
| 2,308,860 | Clark | Jan. 19, 1943 |
| 2,362,829 | Kinley | Nov. 14, 1944 |
| 2,822,148 | Murray | Feb. 4, 1958 |

FOREIGN PATENTS

| 462,987 | Great Britain | Mar. 19, 1937 |